United States Patent [19]

Pazmany

[11] 3,981,463
[45] Sept. 21, 1976

[54] OVERWING THRUST REVERSER
[75] Inventor: Ladislao Pazmany, San Diego, Calif.
[73] Assignee: Rohr Industries, Inc., Chula Vista, Calif.
[22] Filed: Mar. 27, 1975
[21] Appl. No.: 562,532

Related U.S. Application Data
[63] Continuation of Ser. No. 453,377, March 21, 1974, abandoned.

[52] U.S. Cl. .......................... 244/110 B; 60/226 A; 239/265.29; 239/265.37
[51] Int. Cl.² ..................... B64D 33/04; F02K 1/12
[58] Field of Search ............ 244/110 B, 12 D, 23 D, 244/52, 53 R; 239/265.19, 265.27, 265.29, 265.37, 265.41; 60/266 A, 229, 230

[56] References Cited
UNITED STATES PATENTS

| | | | |
|---|---|---|---|
| 2,979,893 | 4/1961 | Meyer | 239/265.29 |
| 3,280,561 | 10/1966 | Kutney | 239/265.19 X |
| 3,598,318 | 8/1971 | Schiel | 60/226 A X |
| 3,655,133 | 4/1972 | Medawar et al. | 244/110 B X |
| 3,688,989 | 9/1972 | McMurtry | 239/265.37 X |
| 3,690,561 | 9/1972 | Potter | 239/265.37 X |
| 3,764,096 | 10/1973 | Wright | 244/53 R |
| 3,791,586 | 2/1974 | Moorehead | 244/110 B X |
| 3,844,482 | 10/1974 | Stearns | 239/265.37 |

Primary Examiner—Trygve M. Blix
Assistant Examiner—Barry L. Kelmachter
Attorney, Agent, or Firm—Patrick J. Schlesinger; Frank D. Gilliam

[57] ABSTRACT

A thrust reverser for utilization with wing mounted jet powered aircraft discharging exhaust gases over the wings thereof. The jet engine is housed in a nacelle which is affixed to the forward part of the wing of the aircraft and the nacelle is appropriately contoured for connection to the wing to form part of the aerodynamic profile therewith. A blocker door in stowed condition is contiguous the wing and is similarly profiled. The blocker door is pivotable counterclockwise to a deployed condition wherein it intercepts the airstream before the exhaust gases are discharged through the nozzle. A deflector door is formed in the nacelle in the vicinity of the trailing edge thereof, and it is pivotable clockwise to its deployed condition in which it diverts the gases delivered to it by the blocker door. Separate hydraulic actuators, one associated with the nacelle structure, and one with the wing structure are employed to deploy and stow the blocker and deflector doors.

4 Claims, 5 Drawing Figures

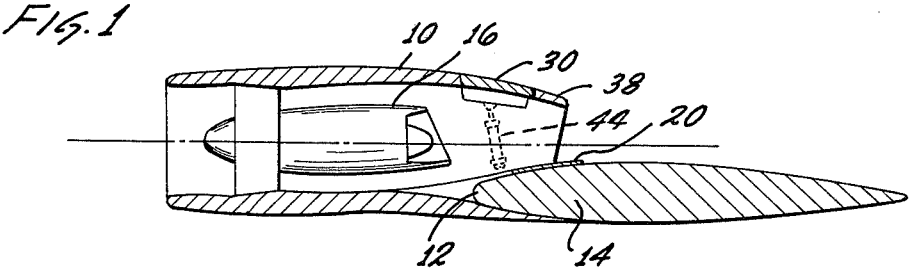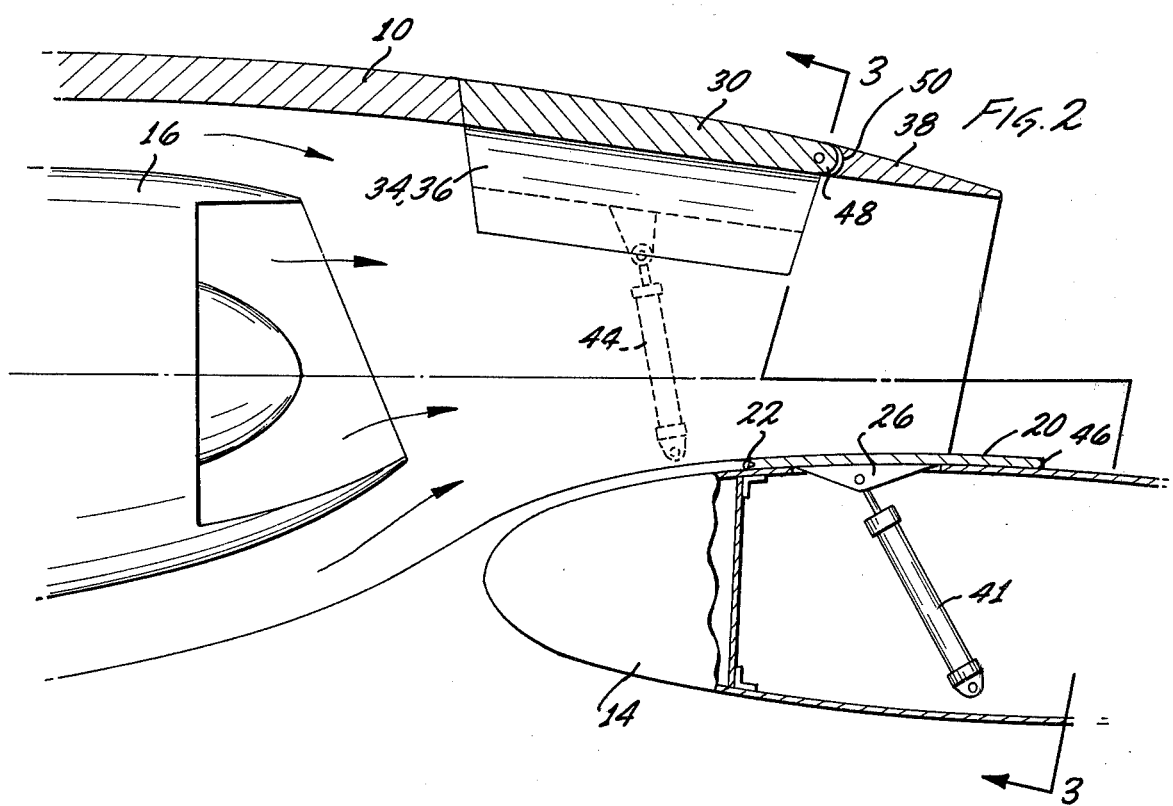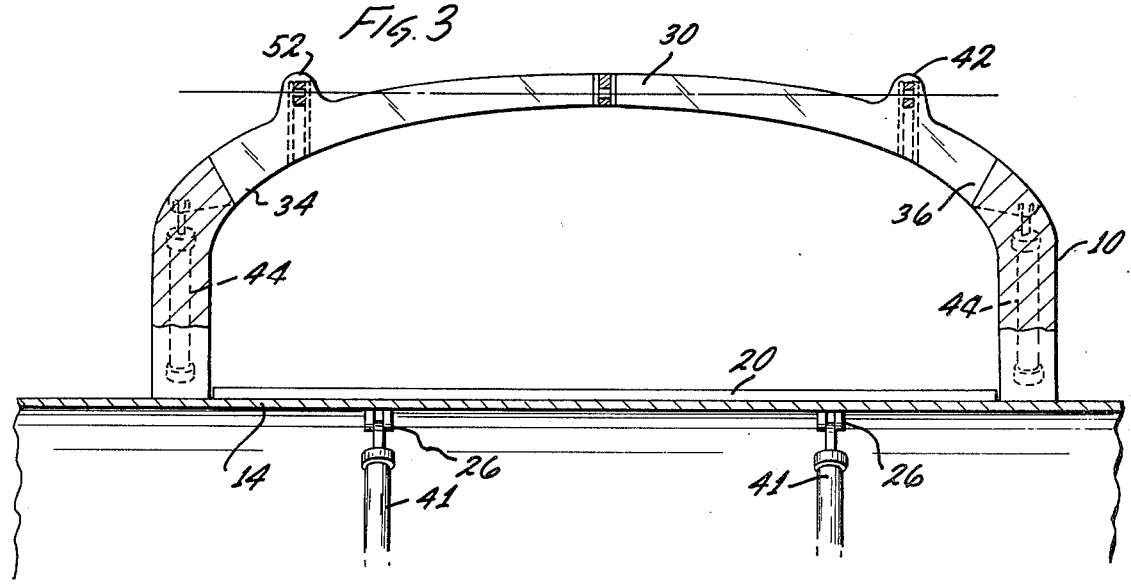

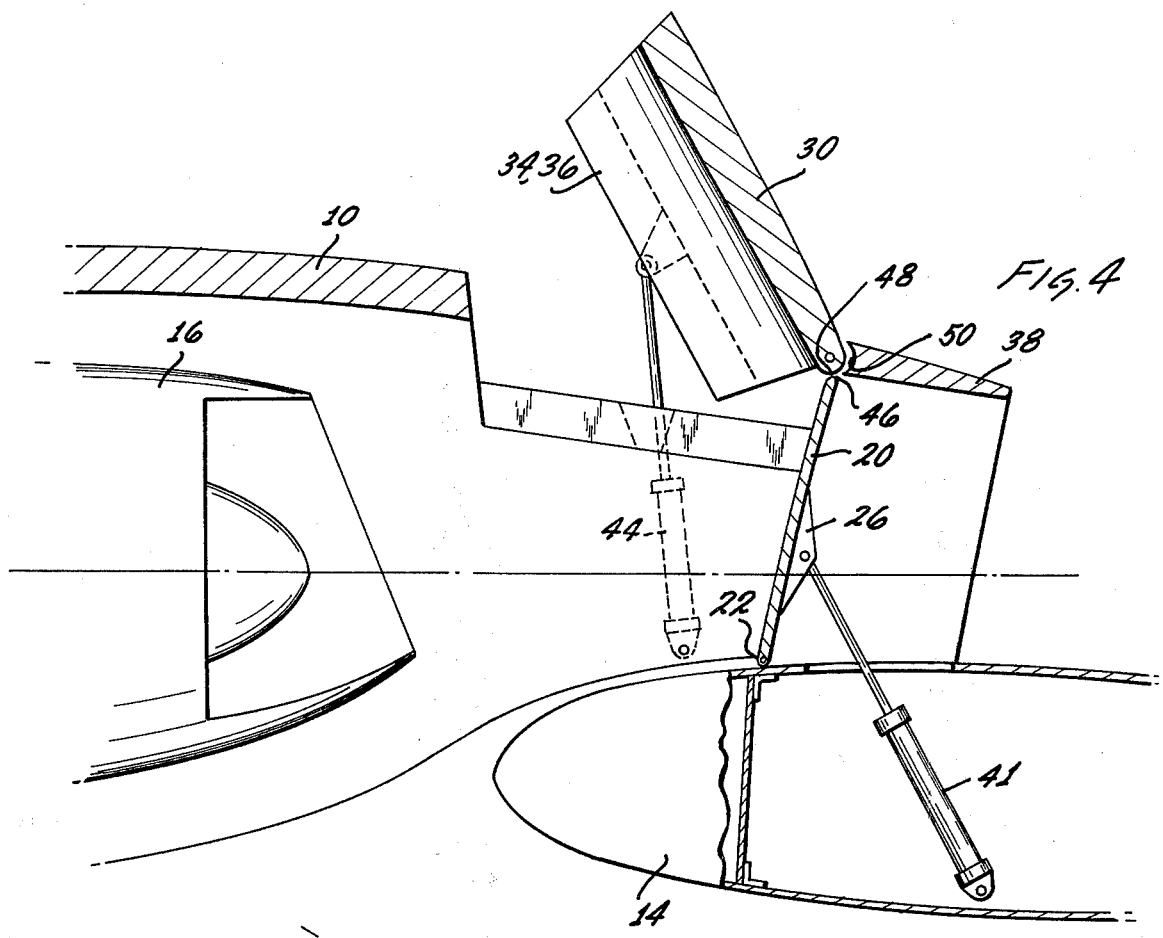
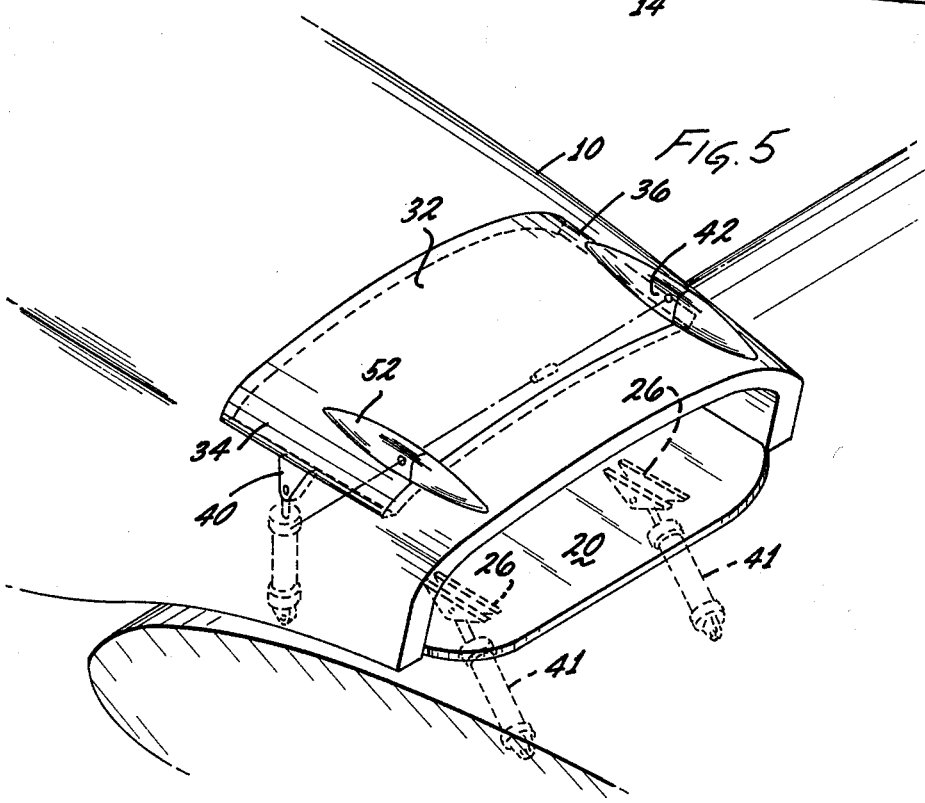

OVERWING THRUST REVERSER

This is a continuation, of application Ser. No. 453,377, filed Mar. 21, 1974 now abandoned.

BACKGROUND OF THE INVENTION

The present invention relates to a thrust reverser for use with a wing mounted jet engine.

There is presently a rather substantial interest in vertical and short take-off and landing aircraft, sometimes known as STOL and VTOL aircraft. Such craft would permit airports to be located closer to the centers of major cities and eleviate the problems that presently exist in traveling from the city to the airport.

A popular contemporary STOL configuration under consideration by the airframe manufacturer is the connection of the power plants on the wings, the wings being swingable to a vertical or take-off position. This requires that the power plant be connected directly to the forward edge of the wing rather than being suspended therefrom by means of a pylon.

In one such embodiment, thrust reversal during ground roll is accomplished by an aft tilt wing portion which is swingable to vertical, thrust blocking position. This mechanism is somewhat undesirable since it necessitates structural complications of the wings of the aircraft. It has been demonstrated that the performance of most jet aircraft is superior when the reversing structure is divorced from the wing.

In other prior art embodiments, the engines are mounted under the wing to provide for greater lift thereon. The reversing apparatus is included within the confines of the wing and selectively actuated by the pilot. It should be evident that this arrangement is inefficient since not all the exhaust gases are redirected through the reverser.

Another prior art structure is directed toward an engine which is mounted to the forward edge of the wing which discharges exhaust gases both over and under the wing. Two separate reverser mechanisms are necessary in this embodiment resulting in a duplication of deflecting and actuating structure. As applied to aircraft, the duplication of any equipment is undesirable particularly since it tends to increase the weight of the craft.

The present invention is effective to control the thrust reversing requirements of wing mounted jet aircraft. The apparatus is characterized by efficient action and effective reversal of thrust.

SUMMARY OF THE INVENTION

A thrust reverser for utilization on wing mounted jet powered aircraft which discharge exhaust gases over the wings thereof. The jet engine is housed in a nacelle which is affixed to the leading edge of the wing. The lower portion of the nacelle is contoured so as to form a continuous aerodynamic profile with the wing.

A blocker door which in the stowed condition overlies the upper surface of the wing is pivotable counterclockwise to its deployed position wherein it intercepts the exhaust gases prior to their being discharged through the nozzle of the nacelle.

A deflector door is formed as part of the nacelle, adjacent the nozzle, and in the stowed position forms part of the interior and exterior profile of the nacelle. The deflector door is pivotable clockwise to a position in which it intercepts the gases jammed by the blocker door and imparts a forward thrust component thereto.

Individual pairs of actuators are utilized on each of the blocker and deflector doors to stow and deploy those doors.

DESCRIPTION OF THE DRAWINGS

FIG. 1 is a schematic of an airplane wing and nacelle assembly that would utilize their reversing apparatus of the instant invention;

FIG. 2 is a cross-sectional, side elevational view of the reversing apparatus of the instant invention;

FIG. 3 is a cross-sectional view taken along the line 3—3 of FIG. 2;

FIG. 4 is a cross-sectional view similar to FIG. 2, showing the reversing apparatus in deployed condition;

FIG. 5 is a perspective view, partially cut-away of the apparatus in stowed condition.

DETAILED DESCRIPTION OF THE DRAWINGS

According to FIG. 1, a nacelle 10 is shown affixed to the leading edge 12 of wing 14. The underside of that nacelle is contoured to form a continuous aerodynamic profile with the wing. A conventional jet engine 16 discharges its exhaust gases only over the wing 14.

The nacelle herein disclosed can be utilized on STOL aircraft which are characterized by very short take-off and landing runs. There have been many variations of these planes, some of which are capable of hovering much as a helicopter. The aircraft utilizing the nacelle and reversing structure of the instant invention contemplates a wing structure that tilts upwardly so that the engine discharge is directed toward the ground. Once the plane is airborne, the wings are swung back to the normal cruise position with the engine thrust generally parallel to the aircraft fuselage. The reverser herein described can also be used by fixed wing aircraft. The structure hereinafter described and claimed is not to be strictly limited to a particular STOL concept. it is merely desired to frame this invention in a representative environment for ease of description. In fact, it should be readily understood that the apparatus of the instant invention may be utilized wherever the earodynamic consideration demands its usage.

the reversing apparatus as detailed in FIGS. 2 - 5 incorporates a blocker door 20, which, in its stowed position overlies the upper surface of wing 14. That blocker door is pivoted at 22 to the wing structure, and as shown in FIG. 4 is pivotable counterclockwise to its deployed, thrust jamming position. An actuator assembly 41 is connected within the wing structure and is active on a bracket 26 which is connected to, or integral with, the blocker door.

The airstream jammed by the blocker door 26 is delivered to a deflector door 30. As shown in FIG. 5, that deflector door comprises a primary diverting surface 32 and side flaps 34, 36. The deflector door, since it forms part of the nacelle, in stowed position, is contoured similar to the nacelle in that vicinity. Except for slightly smaller dimensions, that deflector door is almost identical in shape to the nozzle section 38 of the nacelle.

The side flaps 34, 36 have brackets 40, 42 connected thereto. Actuator assemblies 44, are connected to the nacelle structure and are active on those brackets to deploy and stow the deflector doors. In the stowed position of FIG. 4, the deflector door is pivoted clockwise to define an obtuse angle with respect to blocker door 26. In this position, that blocker door delivers the exhaust gases through the opening vacated by the deflector door, which door imparts a forward component thereto. In the deployed position, the trailing edge 46 of blocker door 20 sealingly engages the trailing edge 48 of the deflector door 30 to prevent the passage of the exhaust gases aft of the nozzle section 38.

It should be noted that the leading edge 50 of nozzle section 38 and the trailing edge 48 are compatibly concave-convexly mated so that the deflector door can pivot without meeting resistance. As shown in FIGS. 3 and 5, the deflector door 30 and nozzle section 38 may be fitted with hinge structure 52, the deflector door being pivotably mounted thereto.

The operation of the reversing apparatus thus described is efficient and reliable. The airstream is intercepted and diverted before passing through the nozzle so that the resultant reversal is effective and quite complete.

Many changes may be made in details of the instant invention, in the method and materials of fabrication, in the configuration and assemblage of the constituent elements, without departing from the spirit and scope of the appended claims, which changes are intended to be embraced therewithin:

I claim:

1. In a trust reverser utilized on wing mounted jet engine powered aircraft discharging exhaust gases over the wings thereof, said jet engine housed in a nacelle being affixed to the leading edge of the wing of the aircraft, the lower portion of the nacelle being appropriately contoured for connection to said wing such that the outer skin on said lower portion forms a continuous aerodynamic profile with said wing, said reverser comprising a blocker door which in stowed position overlies the upper surface of said wing and is similarly profiled, said blocker door being pivotable counterclockwise from a fixed pivot point at its leading edge to its deployed condition wherein it intercepts the exhaust gases prior to said gases being discharged through the nozzle of said nacelle, a deflector door having a fixed pivot point at its trailing edge is formed in the nacelle between the aft portion of said engine and the nozzle of said nacelle in the vicinity of the trailing edge of said nacelle, and which in stowed position forms part of the interior and exterior contour of said nacelle, said deflector door being pivotable clockwise to a deployed position in which it intercepts the exhaust gases delivered thereto by said blocker door and diverts them forwardly, a first actuator means positioned within walls of said nacelle pivotally connected between said nacelle and active on said deflector door to deploy and stow said defector door, and second actuator means positioned within said wing structure and pivotally connected and active on said blocker door at its other end to deploy and stow said blocker door.

2. In the reverser of claim 1, said deflector door includes a pair of depending side flaps to prevent the lateral escape of exhaust gases.

3. In the reverser of claim 2, said first actuator means are active on said side flaps to pivot said deflector door.

4. In the reverser of claim 1 said blocker door is pivoted to said wing at the leading edge of said blocker door and the trailing edge thereof engages the trailing edge of said deflector door during the deployment thereof.

* * * * *